United States Patent [19]

Shirato et al.

[11] 4,335,389

[45] Jun. 15, 1982

[54] LIQUID DROPLET EJECTING RECORDING HEAD

[75] Inventors: Yoshiaki Shirato, Yokohama; Yasushi Takatori, Sagamihara; Toshitami Hara, Tokyo; Yukuo Nishimura, Sagamihara; Michiko Takahashi, Higashi, all of Japan

[73] Assignee: Canon Kabushiki Kaisha, Tokyo, Japan

[21] Appl. No.: 133,140

[22] Filed: Mar. 24, 1980

[30] Foreign Application Priority Data

Mar. 27, 1979 [JP] Japan ............ 54-36041
Dec. 28, 1979 [JP] Japan ............ 54-171335

[51] Int. Cl.[3] ............ G01D 15/18

[52] U.S. Cl. ............ 346/140 R

[58] Field of Search ............ 346/140

[56] References Cited

U.S. PATENT DOCUMENTS 4,243,994 1/1981 Kobayashi ............ 346/140 R
4,251,824 2/1981 Hara ............ 346/140 R
4,296,421 10/1981 Hara et al. .

*Primary Examiner*—Joseph W. Hartary

*Attorney, Agent, or Firm*—Fitzpatrick, Cella, Harper & Scinto

[57] ABSTRACT

A liquid droplet ejecting recording head comprises liquid ejecting portion including an orifice for ejecting liquid droplets and a heat actuating portion communicated with the orifice, and an electrothermal transducer as a means for generating heat energy, the heat energy acting on the liquid at the heat actuating portion for ejecting liquid droplets, characterized in that the part contacting the liquid of the heat actuating portion is made of a material whose ΔW is not more than one-tenth of 1 mg/cm² where ΔW is a decrement weight of the material per unit area in mg/cm² at a time "t", when subjected to a weight decreasing test, the "t" being a time at which ΔW(Al) is 1 mg/cm² where ΔW(Al) is a decrement weight of an aluminum plate of 99.9% in purity per unit area of the tested surface when subjected to the weight decreasing test.

11 Claims, 7 Drawing Figures

LIQUID DROPLET EJECTING RECORDING HEAD

BACKGROUND OF THE INVENTION

1. Field of the Invention

This invention relates to a liquid droplet ejecting recording head, and more particularly, to a liquid droplet ejecting recording head used for an ink jet recording apparatus capable of ejecting a recording liquid, ink, to project the liquid droplets for recording.

2. Description of the Prior Art

Among known recording systems, the so-called ink jet recording method is recognized as a very useful recording system. The ink jet recording method is a kind of non-impact recording system substantially free from noise during recording and can record at a high speed and further the recording can be made on plain paper without any particular fixing treatment.

Heretofore, various ink jet recording methods have been proposed. Some are practically used and some are still under development.

Ink jet recording methods comprises projecting droplets of a recording liquid, so-called ink, by any of various principles of action and depositing the droplets on a record receiving member to conduct recording.

Among ink jet recording methods, the method disclosed in Japanese Patent Laid Open No. Sho 54-51837 or Deutsche Offenlengungsschrift (DOLS) Nr. 2843064 has a feature that heat energy is applied to a liquid to eject liquid droplets, that is, heat energy is utilized as an energy for forming liquid droplets. This feature is quite different from features of conventional ink jet recording methods.

According to the method as disclosed in the above-mentioned patent applications, when a liquid is actuated by heat energy, the liquid is subjected to a state change including a rapid increase in volume and the resulting actuating force serves to eject liquid droplets from an orifice at the tip of the recording and the ejected droplets are deposited onto a record receiving member.

The ink jet recording system of the above mentioned DOLS 2843064 has advantages that the construction of an apparatus for conducting the recording is simpler than that of conventional ones and the system can effect a high speed recording when the ejecting nozzles are arranged in the form of multi-array. However, this system is not so good with respect to durability of the apparatus for conducting recording according to this system. The apparatus employs an electrothermal transducer as means for applying thermal pulse to the recording liquid, and therefore, the transducer is sometimes oxidized and deteriorated or a scorched recording liquid component is deposited on the transducer during its repeated use in contact with the recording liquid, and furthermore, the recording liquid tends to be electrolyzed. As the result, ejection of the recording liquid is sometimes disturbed.

SUMMARY OF THE INVENTION

An object of the present invention is to provide a liquid droplet ejecting recording head free from the above mentioned disadvantages.

Another object of the present invention is to provide a liquid droplet ejecting recording head whose life is very long and which is of a high reliability of stable ejection of liquid droplets and of less trouble.

A further object of the present invention is to provide a liquid droplet ejecting recording head suitable for the recording process of DOLS 2843064.

According to the present invention, there is provided a liquid droplet ejecting recording head comprising a liquid ejecting portion including an orifice for ejecting liquid droplets and a heat actuating portion communicated with the orifice, and an electrothermal transducer as a means for generating heat energy, the heat energy acting on the liquid at the heat actuating portion for ejecting liquid droplets, characterized in that the part contacting the liquid of the heat actuating portion is made of a material whose $\Delta W$ is not more than one-tenth of 1 mg/cm$^2$ where $\Delta W$ is a decrement weight of the material per unit area in mg/cm$^2$ at a time "t", when subjected to a weight decreasing test, the "t" being a time at which $\Delta W(Al)$ is 1 mg/cm$^2$ where $\Delta W(Al)$ is a decrement weight of an aluminum plate of 99.9% in purity per unit area of the tested surface when subjected to the weight decreasing test.

DESCRIPTION OF THE PREFERRED EMBODIMENTS

The liquid droplet ejecting recording head of the present invention can continuously effect a stable liquid droplet ejection for a long time even when the frequency of forming liquid droplets is increased to a great extent for a high speed recording and the level of pulse signals applied to the electrothermal transducer is elevated.

In addition to the above mentioned advantages, the liquid droplet ejecting recording head of the present invention is sufficiently excellent from the economical point of view since it can be produced at a high productivity, is suitable for mass production and can be produced in good yield.

Referring to FIG. 1, there are considered some disadvantages of the prior art liquid droplet ejecting recording head.

Figure 1A:
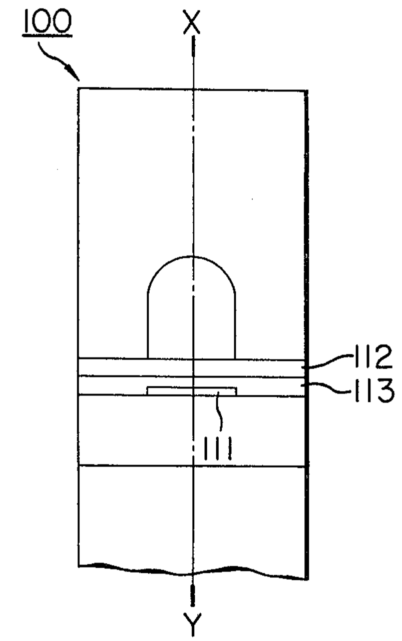
FIG. 1A is a partial front view from the orifice side of a prior art liquid droplet ejecting recording head.
Figure 1B:
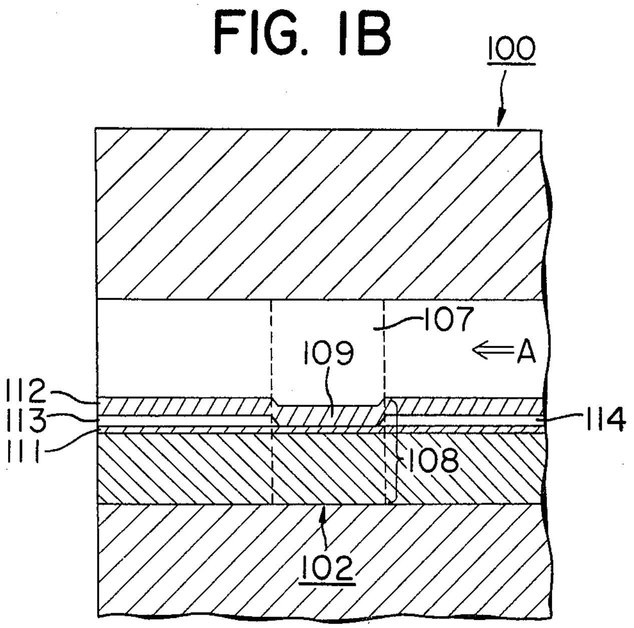
FIG. 1B is a partial cross sectional view taken along the dot and dash line X–Y of FIG. 1A.

The recording head of FIG. 1A and FIG. 1B is used for the ink jet recording method of the above mentioned DOLS 2843064. An electrothermal transducer 102 contacts a liquid introduced in the direction of arrow A at a heating surface 109 (an energy applying surface) in a heat actuating portion 107 (a liquid droplet forming energy actuating portion), and the generated heat energy (a liquid droplet forming energy) is effectively and efficiently applied to the liquid present in heat actuating portion 107. When water is used as a liquid medium for the recording liquid, an upper layer 112 is disposed at least on a resistive heater 111 at a heat generating portion 108 so as to prevent shortcircuiting through the recording liquid between electrodes 113 and 114 and protect a resistive heater layer 111 from attacking by the recording liquid or thermal oxidation. When the liquid medium is not water, the above situation may be changed. In a recording head 100, when electric current is conducted to resistive heater layer 111, the resulting heat energy (a liquid droplet forming energy) is applied to a recording liquid in heat actuating portion 107 and thereby a state change of the recording liquid accompanied by a rapid increase in volume (i.e. a change that the recording liquid in heat actuating portion 107 is converted to a gaseous state in a very short time such as less than $\mu$ sec.) is caused, and a bubble is generated and grown in a moment in the heat actuating portion 107. Then, when the current is off, the bubble is shrunk and disappears in a moment. This shrinking and disappearing speed is almost the same as or a little slower than the speed of bubble generation and growing, and anyhow it is very fast.

The present inventors have found that in this repeating of generation, growing, shrinking and disappearing, particularly, the latter part, i.e. the shrinking and disappearing of bubble, is an important factor determining the life of the recording head 100.

In the above mentioned recording head 100, the process of shrinking and disappearing of a bubble proceeds at a remarkably high speed so that the resulting shock wave directly attacks the heating surface 109, and therefore, upon each liquid droplet ejection the heating surface 109 is attacked by the shock wave resulting in corrosion or destruction of the heating surface due to the shock wave. In particular, the higher the application frequency (driving frequency) of the input pulse signal to drive resistive heater layer 111, that is, the higher the frequency of liquid droplet formation for high speed recording and the higher the level of the input pulse signal, the larger the attack of the shock wave to the heating surface 109, and this is a fundamental cause of shortening the life of recording head 100.

The temperature difference of the heating surface 109 between off and on of current conducted to resistive heater layer 111 is remarkably large, and this remarkably large temperature difference is formed within a very short time and therefore, stress caused by such thermal factor is applied to heat generating portion 108 to form strain in upper layer 112. Thus, crack tends to be formed and this affects the life of recording head 100 when used repeatedly.

Figure 2A:
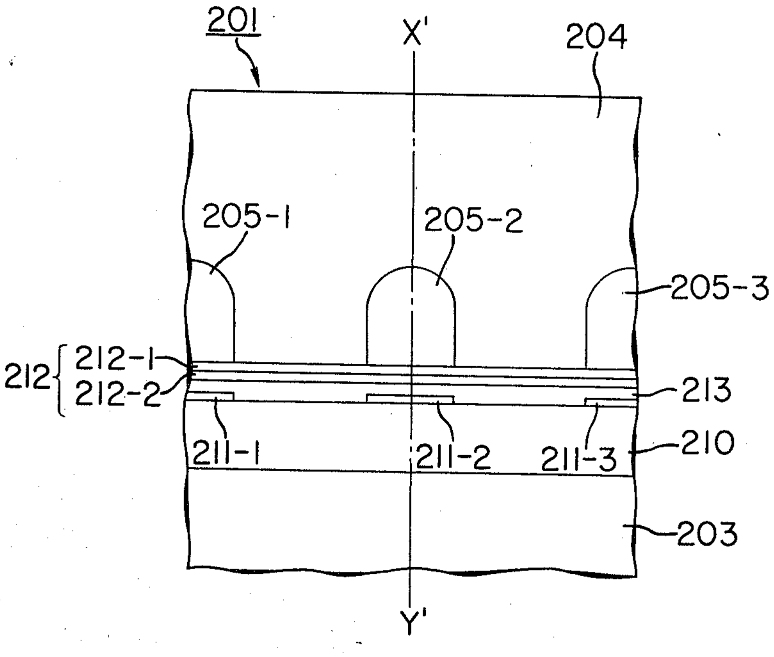
FIG. 2A is a partial front view from the orifice side of an embodiment of the liquid droplet ejecting recording head.
Figure 2B:
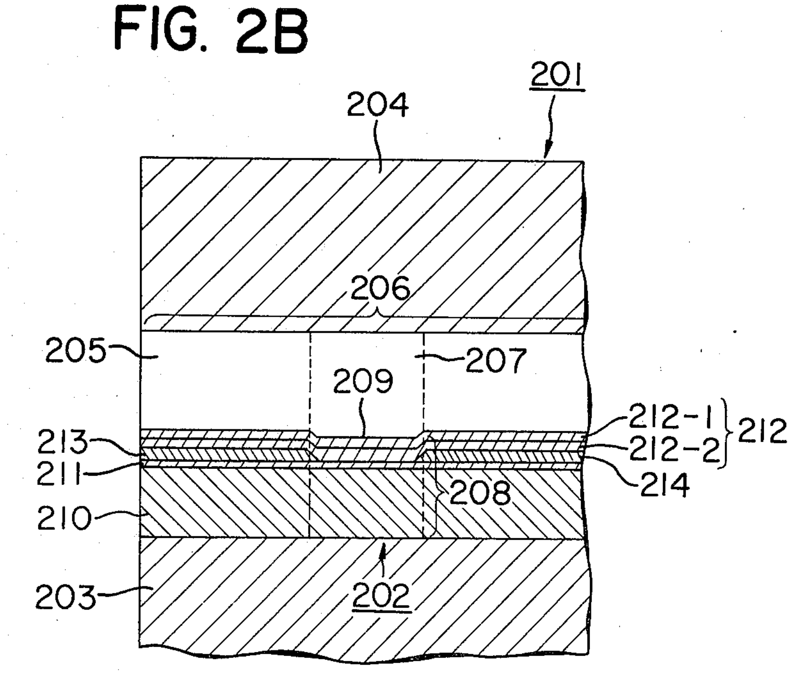
FIG. 2B is a partial cross sectional view taken along the dot and dash line X'–Y'.

Referring to FIG. 2, an embodiment of the present invention is explained.

A recording head 201 is constructed such that a grooved plate 204 having grooves of predetermined width and depth and arranged at a predetermined line density covers a substrate 203 provided with electrothermal transducer 202 to form a structure having orifices 205 and liquid ejecting portions 206.

The recording head 201 in FIG. 2A has a plurality of orifices 205 such as 205-1, 205-2, 205-3 and the like, but a recording head having one orifice is also operable according to the present invention.

A liquid ejecting portion 206 includes orifices 205 (205-1, 205-2 and 205-3) for ejecting liquid droplets at its end and a heat actuating portion 207 where the heat energy generated by an electrothermal transducer 202 is applied to the liquid contained in the liquid ejecting portion 206 to generate a bubble and cause an abrupt state change due to expansion and shrinking.

Heat actuating portion 207 is positioned on a heat generating portion 208 of electrothermal transducer 202 and has a heating surface 209 as its bottom.

Heat generating portion 208 comprises a lower layer 210 overlying a substrate 203, a resistive heater layer 211 overlying the lower layer 210, and an upper layer 212 overlying the resistive heater layer 211. Electrodes 213 and 214 are disposed on the surface of the resistive heater layer 211 so as to conduct a current to the resistive heater layer 211 and generate heat. Electrode 213 is common to all of the heat generating portions of the liquid ejecting portions while electrode 214 is a selecting electrode to select a heat generating portion of liquid ejecting portion to generate heat and is arranged along the liquid conduit of the liquid ejecting portion.

The upper layer 212 serves to isolate the resistive heater layer 211 from the liquid in the liquid ejecting portion 206 so as to protect the layer 211 from chemical and physical action by the liquid and also serves to prevent shortcircuit between electrodes 213 and 214 through the liquid.

The lower layer 210 functions to control amount of heat flow, that is, when a liquid droplet is ejected, the heat amount transferred to the substrate 203 (the heat being generated at the resistive heater layer 211) is smaller than that transferred to the heat actuating portion 207 as far as possible, and after ejecting liquid drops, i.e. after stopping electric current to flow to the resistive heater layer 211, the heat accumulated in the heat actuating portion 207 and the heat generating portion 208 is rapidly transferred to the substrate 203 to quench the liquid in the heat actuating portion 207 and the bubble.

In the liquid droplet ejecting recording head 201, the heating surface 209 contacting the liquid is composed of such a material that its $\Delta W$ is not more than one-tenth of 1 mg/cm$^2$ where $\Delta W$ is a decrement weight of the material per unit area in mg/cm$^2$ at a time "t", when subjected to a weight decreasing test, the "t" being a time at which $\Delta W(Al)$ is 1 mg/cm$^2$ where $\Delta W(Al)$ is a decrement weight of an aluminum plate of 99.9% in purity as a test standard per unit area of the tested surface when subjected to the weight decreasing test.

Referring to FIG. 2, the upper layer 212 is a two-layered structure. One of the two layers is a surface layer 212-1 constituting the wall of the liquid conduit of the liquid ejecting portion 206 and composed of a material having the above mentioned property.

An intermediate layer 212-2 covers the surface of electrodes 213 and 214 and the surface of resistive heater layer 211 in heat generating portion 208. The surface of intermediate layer 212-2 is covered by surface layer 212-1 having the above mentioned property.

The material constituting surface layer 212-1 is that having the above mentioned property. The material, preferably satisfies, in addition to the above mentioned property, the conditions that the particle arrangement is dense, the arranged particles are fine, the material is tenacious, the tensile strength is high, the fatigue limit is high and the like.

Examples of such material are metals selected from Groups IVa, Va, VIa, VIIa and VIII of the Periodic Table, alloys thereof, alloys of at least one of the above mentioned metals and at least one of Au, Ag, Cu and Al, compounds such as carbides, nitrides, borides and silicides of elements selected from Groups IVa, Va and VIa of the Periodic Table, mixtures of at least one of the above mentioned compounds and at least one of the above mentioned metals or alloys. More preferably there can be mentioned Ti, Zr, and Hf as the metal of Group IVa of the Periodic Table, Nb and Ta as the metal of Group Va of the Periodic Table, Cr, Mo and W as the metal of Group VIa. Mn as the metal of Group VIIa of the Periodic Table, and Co, Ni and Fe as the metal of Group VIII of the Periodic Table.

As alloys of the above mentioned metals, there are preferably used, for example, Ti-Mn (Mn: 5–30%), Stellite (Co, Cr, Fe, W), Colmonoy (Ni, Cr, B, Fe), Ni-Cr(Cr: 10–30%) and Ta-Ti.

As alloys of at least one of Au, Ag, Cu and Al and at least one of the above mentioned metals, there may be preferably mentioned aluminum (Cu-Al), Ti-Au, Ta-Au and the like.

Preferable examples of the carbide, nitride, boride and silicide are WC, $HfB_2$, $ZrB_2$, $TiB_2$, TaC, $CrB_2$, $Si_3C_4$, $MoSi_2$, $Cr_3C_2$, WC-Co and $Cr_3C_2$-Ni.

In the present invention, surface layer 212-1 may be formed by a coating method such as dipping, spinner and the like, using the above mentioned material and then baking or by a vacuum deposition method such as sputtering, ion plating, vacuum vapor deposition. Among them, it is preferable to employ a vacuum deposition method which gives a desirable result.

Surface layer 212-1 protects physically, chemically and mechanically the resistive heater layer 211 from attack by the liquid upon repeated use of electrothermal transducer 202. In some case, surface layer 212-1 serves to electrically isolate electrodes 213 and 214 from the liquid not so as to cause a current to flow through the liquid between electrodes 213 and 214 by covering resistive heater layer 211, electrodes 213 and 214 with the surface layer 212-1. However, such function of surface layer 212-1 as electrically insulates is not always necessary in the present invention since the construction as in FIG. 2 has an intermediate layer 212-2 and if the intermediate layer 212-2 has an electrically insulating function, the layer 212-2 can act as an electrically insulating means in place of surface layer 212-1.

According to the present invention, the life of the liquid droplet ejecting recording head can be extended to a great extent by covering a heating surface 209 with a surface layer 212-1 having at least a function as mentioned above, the heating surface 209 being a part of wall which contacts the liquid in the heat actuating portion 207 which is a part of the liquid conduit.

In the recording head 201, upper layer 212 is composed of two layers, that is, surface layer 212-1 and intermediate layer 212-2. When the electric resistivity of surface layer 212-1 is sufficiently larger than that of resistive heater 211 at heat generating portion 208 in such a manner that the current flows between electrodes 213 and 214 through the resistive heater layer 211 only (effective current), that is, the current does not flow through surface layer 212-1 or flows only in a negligible amount (ineffective current), the upper layer 212 may be composed of only one layer, that is, surface layer 212-1.

However, in preferable embodiments of the present invention, most of the surface layers 212-1 have a resistivity which is smaller than that of resistive heater layer 211, and therefore, it is preferable that the upper layer 212 is a two-layered structure including an intermediate layer 212-2 having a resistivity larger than that of resistive heater layer 211 and incapable of flowing an ineffective current. In order that ineffective current may not flow or may flow only in a negligible amount between electrodes 213 and 214, the intermediate layer 212-2 is constructed such that the actual electric resistivity of intermediate layer 212-2 in the heat generating portion 208 is sufficiently larger than that of resistive heater 211 in the heat generating portion 208. For the purpose of preparing such intermediate layer 212-2 as mentioned above, the electric resistivity $\rho_1$ of the intermediate layer 212-2 is usually more than $10^4$ times, preferably more than $10^6$ times, the electric resistivity $\rho_2$ of the resistive heater layer 211.

The intermediate layer 212-2 has a resistivity $\rho_1$ as mentioned above and further is required to have a close contacting property as to electrodes 213 and 214, resistive heater layer 211 and surface layer 212-1. Materials suitable for forming such intermediate layer 212-2 may be oxides such as $SiO_2$, $Ta_2O_5$, $trO_2$, $ZrO_2$ and the like, nitrides such as $Si_3N_4$, aluminum nitride and the like, oxyborides such as Zr-B-O, HfB-O and the like.

Thickness of the intermediate layer 212-2 is preferably as thin as possible if the above mentioned functions can be achieved and is usually 0.1–5 microns, preferably 0.5–2 microns.

According to the present invention, it is preferable that either surface layer 212-1 or intermediate layer 212-2, in particular, the surface layer 212-1, is formed as a thin layer of a high packing ratio of at least 0.9.

Where the resistive heater layer 211, electrodes 213 and 214 are covered with a thin layer of such high packing ratio, they are not directly contacted with the liquid present in the liquid ejecting portion at all.

The term "packing ratio" is a value of (apparent density of the formed thin film)$\neq$(true density of the material forming the thin film).

Where the packing ratio is as high as at least 0.9, there do not remain any film defective portions and pin-holes through which a liquid such as ink can penetrate.

The upper layer 212 containing a thin film having a packing ratio of at least 0.9 improves durability of recording head 201.

The surface layer 212-1 is provided for the purpose of protecting the resistive heater 211 physically, chemically and mechanically. As far as such purpose can be achieved, it is desirable that the film thickness is as thin as possible from economical and productivity point of view.

The lower limit of thickness of surface layer 212-1 is usually 0.1 microns, preferably 0.5 microns, and the upper limit is usually 10 microns, preferably 2 microns.

According to the present invention, decrement weights, ΔW(Al) and ΔW, are obtained by the following test method.

Measurement

A high frequency AC magnetic field is applied to a Ni magnetostrictive vibrator and a sample connected to its end is subjected to the high frequency vibration. The resulting decrement weight is measured.

| Testing Conditions | |
|---|---|
| Frequency: | 7 KHz |
| Amplitude: | 50 microns |
| Testing liquid: | Deaerated distilled water (25 ± 1° C.) |

The surface to be tested is dipped in the testing liquid in the depth of 2.5 mm.

| | |
|---|---|
| Testing time (continuous) t: | Until ΔW(Al) becomes |

-continued

| |
|---|
| 1 mg/cm$^2$ |

Calculation of ΔW(Al) and ΔW

Decrement weights, ΔW(Al) and ΔW, are calculated following the formula below. Sample weight is measured at time "t" after starting the test by means of an automatic balance of sensibility of 0.001 mg.

$$\Delta W(\text{Al}) = \frac{W^0(\text{Al}) - W^t(\text{Al})}{S(\text{Al})}$$

$$\Delta W = \frac{W^0 - W^t}{S}$$

$W^0$(Al): Weight of an aluminum plate of 99.9% in purity used as a standard sample before testing.
$W^t$(Al): Weight of the above mentioned aluminum plate after testing up to time t.
S(Al): Area of the surface to be tested of the aluminum plate before testing.
$W^0$: Weight of a sample before testing.
$W^t$: Weight of the sample after testing up to time t.
S: Area of the surface to be tested of the sample before testing.

Figure 3A:
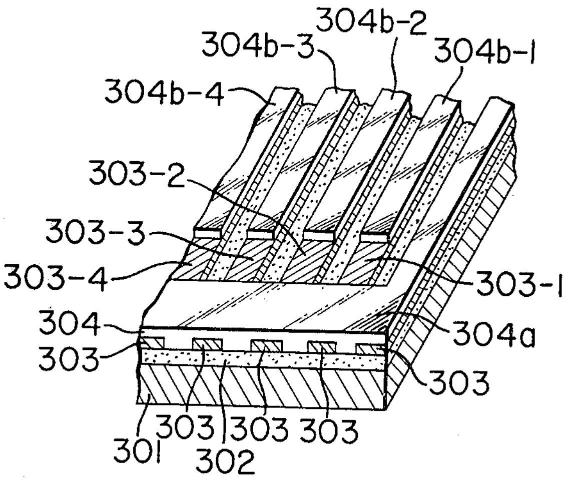
FIGS. 3A–3C are diagram material oblique views of a recording head corresponding to an embodiment of the present invention and that of a comparison example.
Figure 3B:
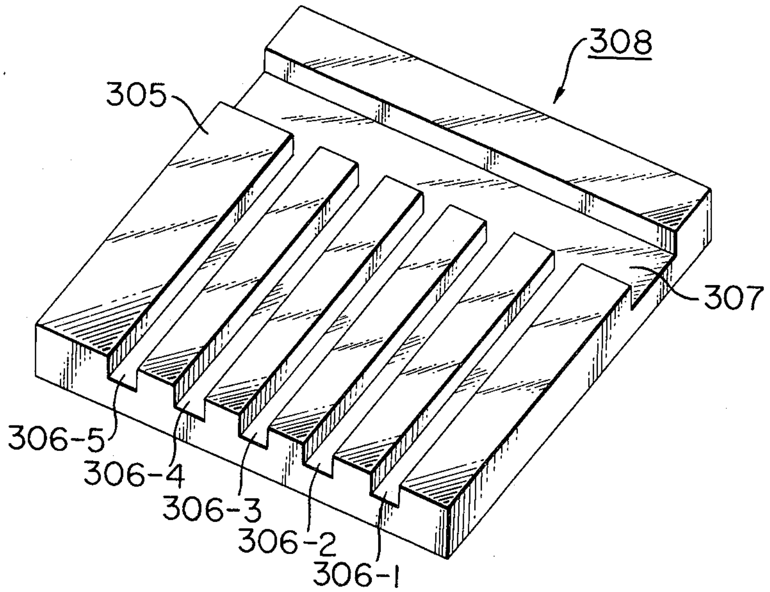
Figure 3C:
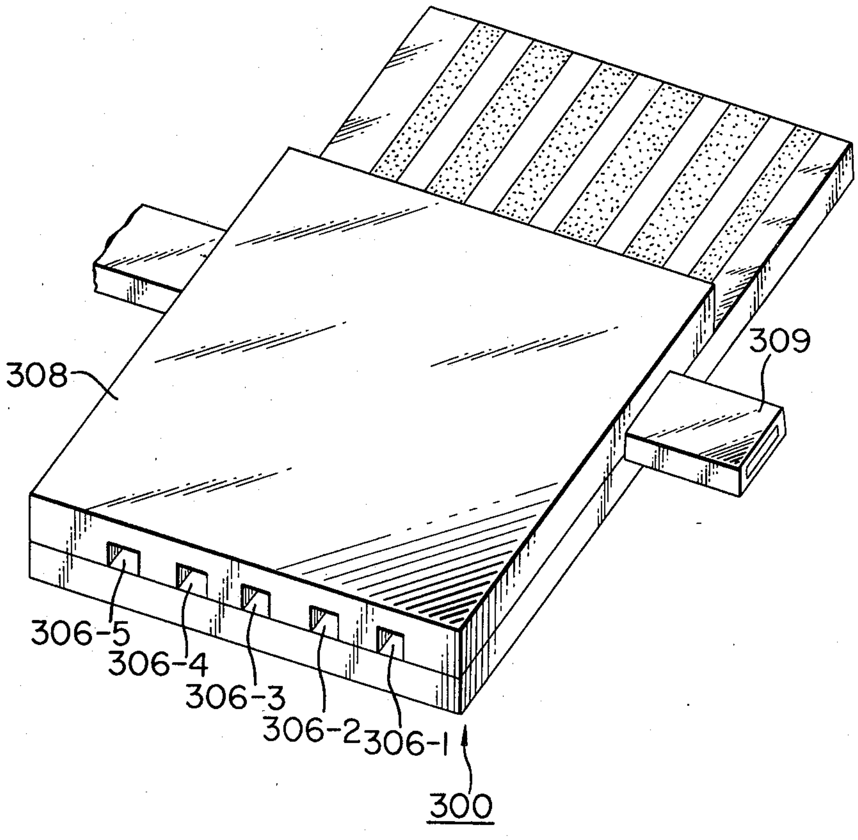

Referring now to FIGS. 3A–3C, there are explained a process for manufacturing a liquid droplet ejecting recording head and its structure as shown in Examples and Comparison Examples.

A substrate on which resistive heater layers are arranged is produced as shown below. FIG. 3A shows an enlarged oblique view of the substrate.

On an aluminum substrate 301 are formed a heat accumulating layer (lower layer) 302, resistive heater layer 303 and then aluminum electrode layer 304. A selective etching is effected to produce resistive heaters 303-1-303-4, each of which is 40 microns wide and 200 microns long, and further common electrode **304*a* and selective electrodes 304*b*-1-304*b*-4 are formed. Further, the surfaces of electrodes 304*a*, 304*b*-1-304*b*-4 and resistive heaters 303-1-303-4** are covered by an upper layer (protecting layer) (not shown).

Apart from above, referring to FIG. 3B, a grooved plate 308 is produced by cutting a glass plate 305 by means of a micro-cutter. The grooved plate 308 has a plurality of grooves 306-1-306-5 (for example, 40 microns wide and 40 microns deep) and a groove for a common ink chamber 307. The resulting substrate having resistive heaters and grooved plate are positioned and then bonded. Further an ink introducing pipe 309 for introducing ink into the common ink chamber 307 from an ink supplying portion (not shown) is connected to integrally complete a recording head 300 as shown in FIG. 3C.

Further the recording head 300 is provided with a lead substrate having lead electrodes (not shown) connected to the above mentioned selective electrodes and common electrode (selective lead electrodes and common electrode).

The invention will be further described by the following examples.

EXAMPLE 1

On a silicon substrate was formed an $SiO_2$ layer in the thickness of 5 microns by sputtering and then a resistive heater, $HfB_2$, was formed in the thickness of 1500 Å by sputtering. Then an aluminum layer was deposited as electrodes in the thickness of 5000 Å by means of an electron beam vapor deposition and then a pattern as shown in FIG. 3A was formed by selective etching. Resistive heater 303 is 50 microns wide and 200 microns long and of 80 ohm. An active sputtering was effected in an atmosphere of a mixture of 70% Ar and 30% $O_2$ using Ta as a target to deposit a tantalum oxide layer in the thickness of 1.0 micron. Then $O_2$ is gradually decreased in the atmosphere and finally completely replaced by Ar while sputtering is being conducted, and thereby a layer of a mixture of tantalum oxide and tantalum was formed on the above mentioned tantalum oxide layer, and a tantalum (Ta) film was subsequently formed in the thickness of 1.2 microns.

The contact portion between the end portion of the Ta film and the Al electrode is preliminarily provided with $SiO_2$ film for the purpose of insulating.

To the above mentioned substrate was bonded a glass plate having grooves as shown in FIG. 3B to produce a recording head as illustrated in FIG. 3C. While introducing an ink mainly composed of water into the recording head from ink introducing pipe 309, a voltage of 25V having a pulse width of 10 μsec was applied to eject ink droplets corresponding to input signals. The cycle was 200 μsec and the ejection was stable. Even when a continuous ejection was effected for 100 hours, the head was normally operated.

COMPARISON EXAMPLE 1

The same sample as in Example 1 was used to effect the same patterning as in Example 1 and a protective layer of $SiO_2$ was formed in the thickness of 1.5 microns. Then a head of the same structure as in Example 1 illustrated in FIG. 3C was produced.

To this recording head was applied a voltage of 23 V and of a pulse width of 10 μsec. at a cycle of 200 μsec. At the beginning, stable ejection corresponding to input signals was effected, but after 50 minutes, 3 pieces of electrothermal transducer out of 5 pieces were broken and ejection became impossible.

COMPARISON EXAMPLE 2

Following the procedure of Example 1 until the tantalum oxide film was formed, the resulting head as illustrated in FIG. 3C was operated by a voltage of 21 V and of a pulse width of 10 μsec at a cycle of 200 μsec. At the beginning, ejection was able to be stably effected for 30 minutes, but then 3 pieces of electrothermal transducer out of 5 pieces were broken resulting in unable ejection.

EXAMPLE 2

After sputtering $SiO_2$ in the thickness of 1.1 microns following the same pattern as in Example 1, the sputtering of $SiO_2$ was further continued while the substrate was gradually moved toward a Ti target to produce a mixture layer of $SiO_2$ and Ti, and then Ti was continuously deposited to form a Ti layer in the thickness of 1.5 microns. The same test (27 V) as in Example 1 was effected to stably eject ink. The life was 200 hours.

EXAMPLE 3

A tantalum oxide film was formed in the thickness of 1.0 micron using $Ta_2O_5$ as a target, and then the sputtering apparatus was changed. The surface of $Ti_2O_5$ layer was scraped off by an inverse sputtering and then a Ta film was formed thereon in the thickness of 1.2 microns. Other than the above procedures, the procedures of Example 1 were repeated to produce a recording head as shown in FIG. 3C. When the head was driven by a voltage of 24 V, stable ejection was effected and the life was 60 hours. In Examples 4–40 below, intermediate layers and surface layers were made of various materials. The recording heads were produced following the procedures of Example 1 above.

In Table 1 below showing Examples 4–40, "Mix" means that an intermediate layer and a surface layer were continuously formed and a mixture layer (interface layer) where components of the intermediate layer and the surface layer are contained are present at the interface between the intermediate layer and the surface layer, and "Inverse" means that, before forming a surface layer by sputtering, an intermediate layer surface was subjected to an inverse sputtering to clean said surface for the purpose of enhancing the close contact between the intermediate layer and the surface layer, and further "—" means that the layers were formed by simply depositing without any particular treatment.

TABLE 1

| Example No. | Intermediate layer (Insulating layer) | µm | "Mix" or "Inverse" | Surface layer (Metal layer) ( ):Mixing ratio | µm | Stable ejection voltage (V) | Life (at least, hours) |
|---|---|---|---|---|---|---|---|
| 4 | $TiO_2$ | 0.8 | "Mix" | Ti | 1.0 | 23 | 170 |
| 5 | $HfO_2$ | 1.2 | "Mix" | Hf | 1.0 | 25 | 60 |
| 6 | $ZrO_2$ | 1.0 | "Mix" | Zr | 1.5 | 26 | 50 |
| 7 | $Ta_2O_5$ | 1.0 | "Mix" | Ta | 2.0 | 30 | 180 |
| 8 | $Re_2O_7$ | 1.0 | "Mix" | Re | 1.5 | 27 | 80 |
| 9 | $Nb_2O_5$ | 0.8 | "Mix" | Nb | 1.5 | 26 | 90 |
| 10 | $U_2O_5$ | 1.0 | "Mix" | V | 1.0 | 23 | 40 |
| 11 | $Cr_2O_3$ | 1.3 | "Mix" | Cr | 1.5 | 28 | 70 |
| 12 | $WO_3$ | 1.0 | "Mix" | W | 1.2 | 23 | 60 |
| 13 | $SiO_2$ | 1.0 | "Mix" | Ta | 2.0 | 30 | 250 |
| 14 | $SiO_2$ | 1.0 | "Inverse" | Ti | 1.0 | 25 | 100 |
| 15 | $SiO_2$ | 1.0 | "Inverse" | Nb | 1.2 | 25 | 70 |
| 16 | $SiO_2$ | 1.0 | "Inverse" | Ta | 2.5 | 34 | 210 |
| 17 | $SiO_2$ | 1.2 | "Inverse" | Re | 1.5 | 27 | 100 |
| 18 | $SiO_2$ | 1.0 | "Inverse" | Cr | 1.0 | 24 | 120 |
| 19 | $SiO_2$ | 1.1 | "Inverse" | Hf | 1.2 | 25 | 90 |
| 20 | $SiO_2$ | 1.0 | "Inverse" | W | 1.0 | 23 | 130 |
| 21 | $SiO_2$ | 0.7 | "Inverse" | Pt | 1.5 | 26 | 170 |
| 22 | $SiO_2$ | 1.0 | "Inverse" | Ni | 1.2 | 25 | 60 |
| 23 | $SiO_2$ | 1.2 | "Inverse" | Pd | 1.5 | 27 | 110 |
| 24 | $SiO_2$ | 1.0 | "Inverse" | Au | 2.0 | 28 | 20 |
| 25 | $Ta_2O_5$ | 1.2 | "Inverse" | Cr | 1.0 | 23 | 100 |
| 26 | $TiO_2$ | 1.0 | "Inverse" | Ta | 1.0 | 23 | 70 |
| 27 | $ZrO_2$ | 1.2 | "Inverse" | Ti(80)<br>Mn(20) | 1.5 | 27 | 110 |
| 28 | $Nb_2O_5$ | 1.0 | "Inverse" | Ti(60)<br>Au(40) | 1.2 | 25 | 80 |
| 29 | $SiO_2$ | 1.0 | "Inverse" | Fe(80)<br>Cr(20) | 1.5 | 27 | 65 |
| 30 | $Ta_2O_5$ | 1.2 | — | Cr | 1.0 | 23 | 50 |
| 31 | $SiO_2$ | 1.0 | — | Fe(55)<br>Ni(45) | 1.6 | 28 | 15 |
| 32 | $TiO_2$ | 0.8 | "Inverse" | Ti(70)<br>Mo(30) | 1.5 | 26 | 180 |
| 33 | $TiO_2$ | 0.8 | | Ti(70)<br>Mo(30) | 1.5 | 26 | 75 |
| 34 | $SiO_2$ | 1.0 | "Inverse" | Ti(92)<br>Mn(8) | 1.0 | 23 | 160 |
| 35 | $SiO_2$ | 1.0 | "Inverse" | Stellite<br>Co(55)<br>Cr(33)<br>Fe(6)<br>W(6) | 1.5 | 25 | 110 |
| 36 | $SiO_2$ | 1.0 | "Inverse" | Colmonoy 6<br>Ni(68)<br>Cr(18)<br>B(4)<br>Fe(10) | 1.5 | 24 | 120 |
| 37 | $Ta_2O_5$ | 1.5 | "Inverse" | Ni(82)<br>Cr(14)<br>B(4) | 1.0 | 25 | 150 |
| 38 | $SiO_2$ | 1.0 | "Inverse" | Mo | 1.5 | 25 | 110 |
| 39 | $SiO_2$ | 1.0 | "Inverse" | Ti(96)<br>Cr(27)<br>Fe(13) | 1.0 | 24 | 170 |
| 40 | $SiO_2$ | 1.0 | "Inverse" | Cu(80)<br>Al(15)<br>Fe(25)<br>Ni(25) | 1.5 | 26 | 100 |

EXAMPLE 41

Repeating the procedure of Example 2 except that thickness of the first layer, $SiO_2$ film, was 0.3 microns, the durability test (stable ejection at 21 V) was carried out. There happened many dielectric breakdown between the Al electrode and the second layer (Ti layer). It has been found that this problem can be solved by using a thin Al electrode and decreasing formation of unevenness of Al film thickness upon etching, but when thickness of $SiO_2$ film is thinner than 1000 Å–2000 Å dielectric breakdown tends to easily happen.

EXAMPLE 42

Following the procedure of Example 2 except that the $SiO_2$ film was 3.0 microns in thick, a head was produced. 50 V was necessary to eject liquid droplets stably by a pulse width of 10 μsec. and the life was as short as 10 hours. This tendency was more remarkable when the thickness of $SiO_2$ film was 4–5 microns or more, and it was necessary for ejecting stably that the pulse width is at least 30 μsec.

EXAMPLE 43

When the Ti film thickness was continuously changed in the range of from 1000 Å to 5 microns in Example 2 and the life was measured, the life was as short as 1–10 hours at the thickness of 1000–3000 Å and the fluctuation was large.

On the other hand, when the thickness was 5 microns and the pulse width was 10 μsec, a stable ejection was not obtained. It was necessary for stable ejection that pulse width was 20 μsec and driving voltage was 38 V. As the result it was found that thickness of the second layer was preferably 5 microns–2000 Å.

COMPARISON EXAMPLE 3

In addition to the procedures of Example 1, $SiO_2$ was sputtered to form a third layer of 1.0 micron thick. 35 V was necessary for stable ejection and the durability was 7 hours. The third layer lowered the heat transfer to ink, and the necessary electric power was increased corresponding to the decrement of heat transfer and the temperature of the resistive heater was elevated. As the result, the durability was poorer than that of Example 1.

However, the second layer served to improve the durability for more than that in Comparison Examples 1 and 2.

EXAMPLE 44

$SiO_2$ was sputtered on a silicon substrate in the thickness of 4 microns and then $HfB_2$ was formed in the thickness of 1500 Å as a resistive member by sputtering. Then, as an electrode, Al was vapor-deposited in the thickness of 5000 Å by electron beam and a selective etching was conducted to form a pattern as illustrated in FIG. 3A. Resistive heater 303 was 50 microns wide and 200 microns long and of 80 ohm. Then, as a protective film (upper layer), $SiO_2$ layer was formed in the thickness of 1.2 microns by sputtering followed by forming a layer of WC in the thickness of 2.0 microns by sputtering. Onto the resulting substrate was adhered a grooved glass plate as shown in FIG. 3B to produce a recording head as shown in FIG. 3C. An ink mainly composed of water was introduced into this head through an ink introducing pipe 309 while a voltage of 30 V was applied at a pulse width of 10 μsec. As the result, liquid droplets were ejected corresponding to input signals. The cycle was 200 μsec. and a stable ejection was effected. The head stably operated even when ejection of liquid droplets was continued for 130 hours.

EXAMPLES 45–57

Repeating the procedures of Example 44 except that $SiO_2$ was deposited in the thickness of 1.2 microns and a different material was used for the surface layer as shown in Table 2 below, the resulting recording head was measured as to stable ejection voltage and life. The results are shown in Table 2.

TABLE 2

| Example No. | Intermediate layer (Insulating layer) | μm | "Mix" or "Inverse" | Surface layer | μm | Stable ejection voltage (V) | Life (at least, hours) |
|---|---|---|---|---|---|---|---|
| 45 | $SiO_2$ | 1.2 | — | WC | 2.0 | 30 | 130 |
| 46 | $SiO_2$ | 1.2 | "Inverse" | $TiB_2$ | 1.5 | 27 | 180 |
| 47 | " | | "Inverse" | $HfB_2$ | 1.5 | 26 | 160 |
| 48 | " | | "Mix" | TaC | 1.0 | 25 | 80 |
| 49 | " | | "Mix" | $ZrB_2$ | 1.0 | 24 | 120 |
| 50 | " | | — | $MoSi_2$ | 1.2 | 25 | 70 |
| 51 | " | | "Inverse" | TaN | 1.5 | 26 | 50 |
| 52 | " | | "Inverse" | $CrB_2$ | 1.6 | 27 | 120 |
| 53 | " | | — | NbB | 1.0 | 25 | 85 |
| 54 | " | | "Inverse" | VB | 1.8 | 28 | 60 |
| 55 | " | | — | ZrC | 1.0 | 26 | 110 |
| 56 | " | | "Inverse" | TaC | 2.0 | 31 | 100 |
| 57 | " | | "Inverse" | TiN | 1.0 | 25 | 80 |

EXAMPLES 58–66

Repeating substantially the procedures of Example 44 except that various oxides were used as a material for the intermediate layer and carbides, borides or mixtures of a metal and such compound were used as the surface layer, there were produced recording heads as shown in FIG. 3C. The results of liquid droplet ejection are shown in Table 3. It will be clear that the recording head according to the present invention is very good.

TABLE 3

| Example No. | Intermediate layer (Insulating layer) | μm | "Mix" or "Inverse" | Surface layer (Metal layer) ( ):Mixing ratio | μm | Stable ejection voltage (V) | Life (at least, hours) |
|---|---|---|---|---|---|---|---|
| 58 | $Ta_2O_5$ | 1.0 | "Inverse" | WC | 1.5 | 27 | 120 |
| 59 | $Ta_2O_5$ | 1.0 | "Mix" | WC | 1.5 | 27 | 150 |
| 60 | $TiO_2$ | 1.5 | "Inverse" | WC(70) Cr(30) | 1.8 | 26 | 170 |
| 61 | $SiO_2$ | 1.0 | "Inverse" | $HfB_2$(65) Ta(35) | 1.5 | 25 | 120 |
| 62 | $ZrO_2$ | 1.0 | — | $ZrB_2$(40) | 1.5 | 24 | 75 |

TABLE 3-continued

| Example No. | Intermediate layer (Insulating layer) | μm | "Mix" or "Inverse" | Surface layer (Metal layer) ( ):Mixing ratio | μm | Stable ejection voltage (V) | Life (at least, hours) |
|---|---|---|---|---|---|---|---|
| 63 | $SiO_2$ | 1.5 | "Inverse" | $Cr_2B$(60) $TiB_2$(50) Ti(50) | 1.2 | 25 | 160 |
| 64 | $Nb_2O_5$ | 1.0 | — | $HfB_2$(80) Hf(20) | 1.0 | 24 | 90 |
| 65 | $SiO_2$ | 1.2 | "Inverse" | $TiB_2$(80) Mn(20) | 1.5 | 27 | 190 |
| 66 | $SiO_2$ | 1.8 | "Inverse" | $Cr_2B$(20) Ni(80) | 1.8 | 29 | 130 |

EXAMPLE 67

Repeating the procedures of Example 44 except that the first layer (intermediate layer) composed of $SiO_2$ film was 0.3 microns, the resulting recording head was subjected to the durability test where a stable ejection was effected by 24 V. Many dielectric breakdowns happened between the Al electrode and the second layer (surface layer) composed of WC. This drawback was solved by using a thin Al electrode and decreasing formation of unevenness of Al film thickness upon etching. When the thickness of $SiO_2$ film was about 1000 Å–2000 Å or less, dielectric breakdown tended to easily happen.

EXAMPLE 68

Repeating the procedures of Example 44 except that thickness of the $SiO_2$ film was 3.0 microns, 50 V was required for operating the resulting recording head to eject liquid droplets stably at a pulse width of 10 μsec, and the life was shorter by 10 hours than that of Example 44. This tendency was more remarkable when thickness of $SiO_2$ film was not less than 4–5 microns, and therefore, a pulse width of at least 30 μsec was required for stable ejection.

EXAMPLE 69

Repeating the procedures of Example 44 except that the WC film thickness was varied continuously in the range of 1000 Å–5 microns, the life of the resulting recording heads with the WC film thickness of 1000 Å–3000 Å was as short as 1–10 hours and the fluctuation was large. On the other hand, a stable ejection was not effected at a pulse width of 10 μsec when the thickness was 5 microns, and 41 V was required at a pulse width of 20 μsec for a stable ejection.

From the above, it was found that the second layer was preferably about 5 microns–2000 Å in thickness.

EXAMPLE 70

The same pattern as in Example 44 was formed and then subjected to sputtering in an atmosphere of a mixture of $Ar$–$N_2$ using Al as a target to form an aluminum nitride layer of 1.5 microns thick. The life was 50 hours and good results were obtained.

EXAMPLES 71-84

Substrates provided with resistive heaters used in the following Examples and Comparison Examples were produced as shown below. FIG. 3A shows an enlarged oblique view of said substrate.

On an alumina substrate 301 were formed an $SiO_2$ heat accumulating layer 302 of 50 microns thick, a $ZrB_2$ resistive heater layer 303 of 800 Å thick and an aluminum electrode layer 304 of 5000 Å thick, and a selective etching was applied to form resistive heaters 303-1–303-4 each of which was 40 microns wide and 200 microns long. Further etching was applied to form selective electrodes **304*b*-1–304*b*-4 and a common electrode 304*a***. In addition, a protecting layer (not shown) was formed on the surface of each of the electrodes and resistive heaters as shown in Table 4 below.

Apart from the above, a grooved glass plate 308 shown in FIG. 3B provided with a plurality of grooves 306-1–306-5 (40 microns wide and 40 microns deep) and a common ink chamber 307 was produced by using a micro-cutter.

The substrate having resistive heaters and the grooved plate were positioned such that the resistive heaters correspond to the grooves, respectively and then bonded. An ink introducing pipe 309 for introducing ink into a common ink chamber 307 from an ink supplying portion (not shown) was also connected thereto to integrally complete a recording head 300 as illustrated in FIG. 3C. Further, to the resulting recording head 300 was attached a lead substrate (not shown) having electrode leads (common electrode lead and selective electrode leads) connected to the above mentioned common electrode and selective electrodes. Then, ink ejecting experiments were carried out under the conditions, that is, applying a rectangular voltage pulse of 40 V with a pulse width of 10 μsec and a pulse input cycle of 200 μsec to the resistive heaters through the electrode leads.

Composition of the ink was:

| | | |
|---|---|---|
| Water | 70 | parts by weight |
| Diethyleneglycol | 29 | parts by weight |
| Black dye (Nigrosine) | 1 | parts by weight |

The results are shown in Table 5 below. It is clear that the durability and recording characteristics are good.

Evaluation of durability was made based on the number of times of repeating application of electric pulse to which the recording head could withstand.

| Standard of evaluation durability |
|---|
| A: More than $10^9$ times |
| B: $10^8$–$10^9$ times |
| C: Less than $10^5$ times |

TABLE 4

| Example No. | Construction of Protecting Layer |
|---|---|
| 71 | Sputtering $SiO_2$ in the thickness of 0.5 microns and then vapor-depositing nickel** |

TABLE 4-continued

| Example No. | Construction of Protecting Layer |
|---|---|
| | in the thickness of 500 Å. |
| 72 | Sputtering $SiO_2$ in the thickness of 1 micron and then vapor-depositing zirconium** in the thickness of 2000 Å. |
| 73 | Sputtering $SiO_2$ in the thickness of 0.2 microns, and then vapor-depositing tantalum** in the thickness of 500Å and then titanium in the thickness of 500 Å. |
| 74 | Sputtering $SiO_2$ in the thickness of 0.5 microns, and then vapor-depositing Cr** in the thickness of 500 Å and then Au** in the thickness of 4000 Å. |
| 75 | Sputtering $Al_2O_3$ in the thickness of 0.5 microns and then $HfB_2$** in the thickness of 0.5 microns. |
| 76 | Activated sputtering in an atmosphere of 70% Ar and 30% $O_2$ using Si as a target, and then activated sputtering in an atmosphere of 70% Ar and 30% $N_2$ to deposit subsequently silicon oxide, silicon oxynitride and silicon nitride** in the total thickness of 1 micron. |
| 77 | Sputtering $Ta_2O_5$ in the thickness of 0.5 microns and then $ZrB_2$** in the thickness of 0.5 microns. |
| 78 | Gas phase reaction of $SiH_4$ with $NH_3$ to form $Si_3N_4$** film (1 micron thick). |
| 79 | Sputtering $SiO_2$ in the thickness of 0.3 microns and then $HfB_2$** in the thickness of 0.5 microns. |
| 80 | Sputtering $SiO_2$ in the thickness of 0.3 microns and then gas phase reaction of $SiH_4$ with $NH_3$ to form an $Si_3N_4$** film of 1 micron thick. |
| 81 | Sputtering $Al_2O_3$ in the thickness of 0.2 microns and then molybdenum silicide** in the thickness of 1.0 micron. |
| 82 | Reactive sputtering in an atmosphere of 50% Ar and 50% $O_2$ using a tantalum plate as a target to form $Ta_2O_5$ and further continuing the reactive sputtering while the atmosphere was continuously changed to a pure Ar atmosphere, and as the result, the depositing material was continuously changed from $Ta_2O_5$ to Ta film** (Film thickness being 0.7 microns). |
| 83 | Following the procedure of Example 82 by using a titanium plate as a target to form continuously a film of 1.5 microns which composition continuously changes from $TiO_2$ to Ti film**. The film is 1.5 microns thick. |
| 84 | Following the procedure of Example 82 using a zirconium plate as a target to form a film of 1.5 microns which component changes continuously from $ZrO_2$ to Zr. |
| Comparison Example 4 | No protecting layer |
| Comparison Example 5 | Sputtering to form an $SiO_2$** film of 1 micron in thickness. |

TABLE 5

| | Packing ratio of a film with ** | Durability of recording head |
|---|---|---|
| Example No. | | |
| 71 | at least 0.90 | B |
| 72 | at least 0.90 | A |
| 73 | at least 0.90 | A |
| 74 | 0.95-1.0 | A |
| 75 | at least 0.90 | A |
| 76 | at least 0.90 | A |
| 77 | at least 0.90 | A |
| 78 | at least 0.90 | A |
| 79 | 0.95 | A |
| 80 | at least 0.90 | A |

TABLE 5-continued

| | Packing ratio of a film with ** | Durability of recording head |
|---|---|---|
| 81 | 0.90 | B |
| 82 | 0.95-1.0 | A |
| 83 | 0.95-1.0 | A |
| 84 | 0.95-1.0 | A |
| Comparison Example 4 | | C |
| Comparison Example 5 | 0.8 | C |

In view of the foregoing, it will be clear that a recording head having a protecting layer containing a thin film having a packing ratio of not less than 0.9 is excellent as to durability. It is considered that this good result is due to prevention of ink from penetrating into the resistive heater and the like, prevention of the resistive heater and the like from being oxidized and corroded and suppressing electrolysis of ink.

What we claim is:

1. A liquid droplet ejecting recording head comprising a liquid ejecting portion including an orifice for ejecting liquid droplets and a heat actuating portion communicated with the orifice, and an electrothermal transducer as a means for generating heat energy, the heat energy acting on the liquid at the heat actuating portion for ejecting liquid droplets, characterized in that the part contacting the liquid of the heat actuating portion is made of a material whose $\Delta W$ is not more than one-tenth of 1 $mg/cm^2$ where $\Delta W$ is a decrement weight of the material per unit area in $mg/cm^2$ at a time "t", when subjected to a weight decreasing test, the "t" being a time at which $\Delta W(Al)$ is 1 $mg/cm^2$ where $\Delta W(Al)$ is a decrement weight of an aluminum plate of 99.9% in purity per unit area of the tested surface when subjected to the weight decreasing test.

2. A liquid droplet ejecting recording head according to claim 1 in which the electrothermal transducer contains a resistive heater.

3. A liquid droplet ejecting recording head according to claim 1 in which the material is in the form of film.

4. A liquid droplet ejecting recording head according to claim 1 in which the material is a film of 0.1-10 microns thick.

5. A liquid droplet ejecting recording head according to claim 1 in which the material is a metal selected from the group consisting of metals of Groups IVa, Va, VIa, VIIa and VIII of the Periodic Table.

6. A liquid droplet ejecting recording head according to claim 1 in which the material is an alloy of at least one member selected from the group consisting of Au, Ag, Cu, and Al and at least one metal selected from the group consisting of Groups IVa, Va, VIa, VIIa and VIII of the Periodic Table.

7. A liquid droplet ejecting recording head according to claim 1 in which the material is at least one compound selected from the group consisting of carbides, nitrides, borides and silicides of at least one element selected from the group consisting of Groups IVa, Va and VIa of the Periodic Table.

8. A liquid droplet ejecting recording head according to claim 1 in which the material is a mixture of at least one compound selected from the group consisting of carbides, nitrides, borides and silicides of at least one element selected from the group consisting of Groups IVa, Va and VIa of the Periodic Table, and one member selected from a metal selected from the group consisting of metals of Groups IVa, Va, VIa, VIIa and VIII of the Periodic Table and an alloy of at least one member selected from the group consisting of Au, Ag, Cu, and Al and at least one metal selected from the group consisting of Groups IVa, Va, VIa, VIIa and VIII of the Periodic Table.

9. A liquid droplet ejecting recording head according to claim 1 in which the material is a thin film having packing ratio of not less than 0.9.

10. A liquid droplet ejecting recording head according to claim 2 in which the resistive heater is in a form of thin film.

11. A liquid droplet ejecting recording head which ejects from an orifice a recording liquid introduced into a chamber communicated with an ejecting orifice in a form of droplet to attach the drop to a record receiving surface, characterized in that an electrothermal transducer is arranged at at least one part inside of the chamber and the surface of the electrothermal transducer contacting the liquid is covered with a protecting layer comprising at least one thin layer having a packing ratio of not less than 0.9.

* * * * *